Oct. 2, 1934.   R. SOLLICH   1,975,560

APPARATUS FOR BOILING VISCOUS SOLUTIONS

Filed March 5, 1931   2 Sheets-Sheet 1

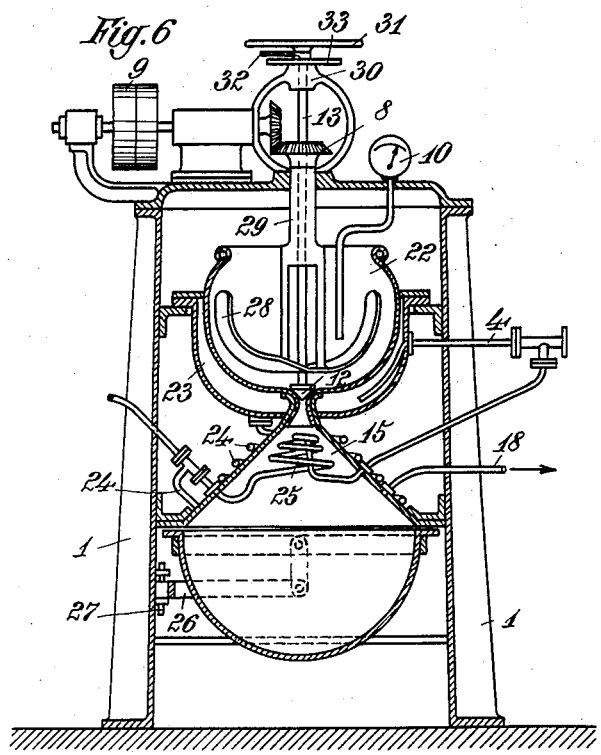
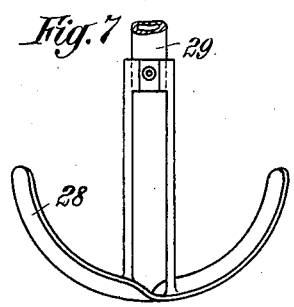
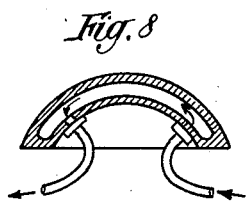

Patented Oct. 2, 1934

1,975,560

UNITED STATES PATENT OFFICE 1,975,560

APPARATUS FOR BOILING VISCOUS SOLUTIONS

Robert Sollich, Rostock, Mecklenburg, Germany

Application March 5, 1931, Serial No. 520,322
In Germany March 5, 1930

2 Claims. (Cl. 159—2)

The known processes for boiling viscous solutions, more particularly of sugar, marmalade, caramel and the like, consist in heating the solutions in externally heated containers or in causing them to flow along heated walls in order to evaporate the water. The bubbles of steam ascend in the viscous mass and escape into the surrounding space. It is also known to boil the solutions, which have been previously boiled at atmospheric pressure, again in an evacuated vessel, in order to accelerate the evaporation of the water particles which are not easily separated from the solutions, especially after the boiling has been continued for a long time. In all the known processes, however, the boiling takes a relatively long time, and this has an unfavourable effect on the properties of the products and more particularly in the case of sugar substances induces crystallization of the sugar.

The present invention consists in a process for boiling viscous solutions, particularly of caramel, marmalade or the like, in which the material, previously boiled at atmospheric or higher pressure, is introduced as an atomized jet, as previously known in the concentration and distillation of non-viscous liquids, into a vessel maintained at a lower pressure, more particularly into an evacuated vessel in which an impact plate is provided, preferably at the inlet, the temperature of the introduced material being above the boiling point of the liquid at the pressure present in the said vessel. In carrying out the process, the preliminary or first stage boiler, is preferably directly connected by an atomizing nozzle with an evacuated vessel, which can be removed or swung outwards; the boiler is provided with a stirrer, the blades of which are preferably formed as vanes, by which the material is set in whirling motion and pressed against the walls of the preheater. In order to be able to adjust the nozzle to the required fineness of the jet, the nozzle spindle, disposed within the hollow shaft of the stirrer, is provided with a hand wheel at its upper end which is screw-threaded in a boring of a fixed support, an indicator secured to the spindle being adapted to move over a graduated scale. The nozzle between the first stage boiler and the preferably evacuated vessel, connected with the boiler by means of the nozzle, can be constructed in any suitable manner, for example in helical form.

Two embodiments of apparatus for carrying out the process according to the invention are represented in the accompanying drawings, in which—

Fig. 6 shows a modified construction of the boiler apparatus and

Fig. 7 shows on a larger scale the stirrer of Fig. 6 formed with helical vanes.

Fig. 8 shows an impact plate for improving the distribution of the atomized jet.

Figure 1:
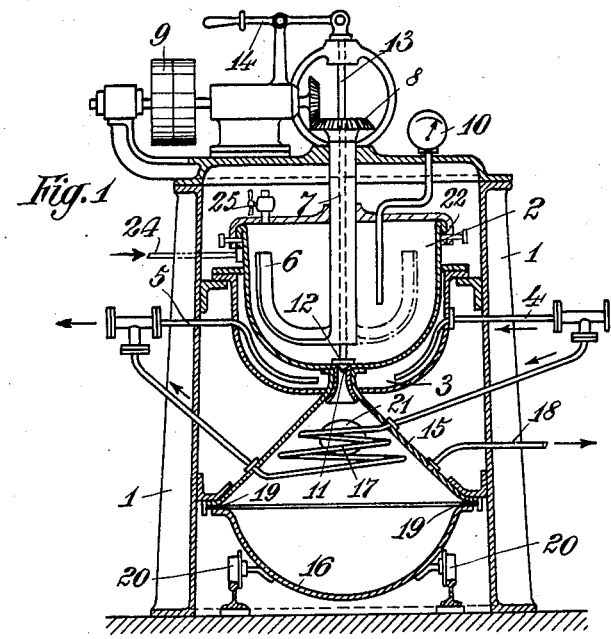
Fig. 1 is a longitudinal section through the apparatus.
Figure 2:
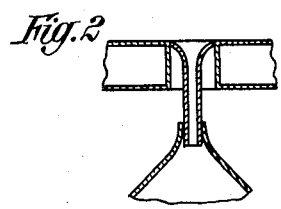
Figs. 2–5 show some contours of nozzles for atomizing the material.
Figure 3:
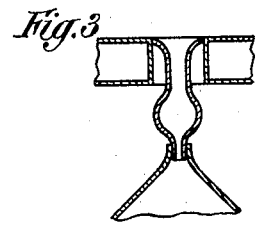
Figure 4:
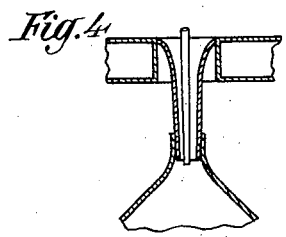
Figure 5:
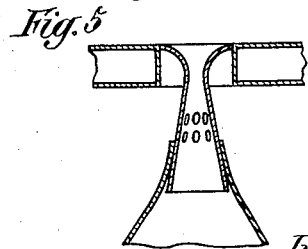

In the construction shown in Fig. 1, a first stage boiler 2 is arranged in the framework 1 and has an external casing 3, which is heated by steam from a pipe 4. Water of condensation is drawn off through a pipe 5. A stirrer 6 is provided in the boiler 2 and is rigidly connected with a hollow shaft 7 rotated by means of a bevel gear 8 and belt pulleys 9. A thermometer 10 is inserted in the boiler 2 in a position such that it does not come into contact with the stirrer 6.

An opening 11 provided at the bottom point of the boiler 2 is connected by a nozzle with a container 15 disposed below the said boiler. The nozzle is closed by a needle valve 13, the stem of which is led through the hollow shaft 7 and is adapted to be raised or lowered by a hand lever 14. The opening 11 is so narrow, that the jet of liquid passing through it is finely atomized, the atomization being facilitated by the form imparted to the nozzle, as shown for example in Figs. 2–5.

The vessel or boiler connected to the bottom of the boiler 2 consists of an upper part 15, rigidly connected with the boiler 2 and widened downward into funnel shape, and a removable lower part 16 acting as a receiver or collector. A heating worm 17, traversed by a current of steam, and disposed in the part 15 so that it is not in contact with the atomized jet, prevents the formation of water of condensation. A tube 18 leads the vapour from the boiler 15 to a jet condenser which is connected with a vacuum pump. The receiver 16 has a packing ring 19 and is held against the upper part 15 by the partial vacuum. It is mounted on rollers 20 which are displaceable on rails, so that the receiver 16, after the vacuum has been destroyed, can be removed, emptied, and again introduced. Two glass windows 21 allow the working of the apparatus to be supervised.

The operation is as follows:—

After the opening 11 has been closed by the needle valve 12, the boiler 2 is filled with the solution, the stirrer gear 6, 7, 8, 9 is set in action, and steam is introduced into the casing 3. At the same time the boiler 15, 16 is heated by the worm 17 and the air is withdrawn. As soon as the thermometer 10 shows that the solution is at the required temperature, the needle valve is raised, so that the liquid is injected in a finely atomized jet into the boiler 15, 16 and the water particles are evaporated on account of the pressure difference between the boilers 2 and 15 and the dried material is collected in the vessel 16. After the boiler 2 has been emptied, the opening 11 is again closed, the vacuum in the boiler 15, 16 is destroyed, by closing the pipe 18 and introducing air through the opening 11, and the receiver 16, which by this means automatically is released, is removed and emptied. When the vessel 16 is again connected, the boiling operation can be repeated.

In the construction shown in Fig. 6, the first stage boiler 22 is, as before, disposed in the framework 1. The bottom casing 23 is, as before, charged with steam through the pipe 4, the water of condensation is led away through an opening provided at the bottom of the casing 23 into a conically wound worm 24 and serves for heating the upper part 15 of the second stage boiler, in which a conical steam heated worm 25 opposite the inlet nozzle is arranged to act as an impact plate. The part 15 is connected through the pipe 18 to a condenser and vacuum pump. The lower part 16 serving as a receiver for the dried material can be swung outwards and is tiltably supported in a fork-shaped connection 26 which with the part 16 can be swung about a bolt 27 secured to the wall of the framework.

The stirrer (Fig. 7) provided in the boiler 22 consists of two or more vanes opposite one another, conforming to the shape of the walls of the boiler, which press the material against the hot walls of the boiler, so that it rises in whirling motion along the walls. The vanes 28 are secured to a hollow shaft 29, through which is led in the same manner as in the first construction the stem 13 of the needle valve 12. In order to obtain an exact adjustment of the cross-section of the jet, the stem 13 of the needle valve is provided at its upper end with a screw-thread and is guided in a supporting member 30 provided with an internal thread. The stem 13 is rotated by a hand wheel 31 which carries an indicator 32, movable over a scale 33. The shaft of the stirring gear is driven in the same manner as in the construction shown in Fig. 1.

The advantage of this construction is that a very small charge can be treated, since the vanes 28 allow the material to rise at the walls, so that the heating surface is most efficiently utilized. Any ejection of the solution is prevented by a constriction at the upper edge of the boiler. Also, the atomization can be improved by increasing or decreasing as required the opening at the needle valve and by the arrangement of an impact plate in the boiler 15 opposite the nozzle opening.

The conical heating worm 25 can be replaced by an impact plate as shown in Fig. 8; also the steam in the heating worm 25 can be utilized for heating the external walls of the boiler 15. The apparatus can be arranged so that there need be no interruption of the working, the material being introduced continuously into the nozzle and atomized in the boiler 15. In this case the dried material collecting at the bottom of the vessel 16 can be removed either periodically or continuously. Also, instead of heating the boiler 15, heat insulation can be provided on its external surface.

I claim.

1. An apparatus for boiling caramel marmalade and the like, comprising an upper heating vessel acting as a first stage boiler, means for externally heating said vessel, a hollow stirrer axle projecting down into the upper vessel and provided with vanes for pressing and whirling the liquid against the walls of the vessel, a lower vessel with an outlet pipe for suction and provided with an upper steam heated portion, an atomizing nozzle connecting the upper vessel with the lower vessel and having an adjustable stem inclosed by the hollow stirrer axle and controlled by a scale and an indicator, and a removable receiver connected to the lower vessel by suction.

2. In apparatus for rendering viscous material dry, an open vessel to receive the material in a viscous condition having an outlet through the bottom, means to externally heat said vessel and effect a heating of the material therein at atmospheric pressure, a stirrer rotatably suspended in said vessel embodying a tubular support having blades extended radially therefrom arranged to whirl and press the material against the wall of the vessel by the rotation thereof, a valve for the vessel outlet having a stem extended through the support of the stirrer adapted to control and normally closing the outlet, a second vessel consisting of a fixed section having connection with the outlet of the first vessel to receive material therefrom and a removable collecting section, and said vessel adapted for connection with suction means to maintain the vessel at a low pressure and evaporation of moisture in material delivered therein, and heating means in the second vessel for impact of the material delivered into said vessel from the first vessel.

ROBERT SOLLICH.